United States Patent [19]

Haviv

[11] Patent Number: 5,129,290
[45] Date of Patent: * Jul. 14, 1992

[54] TOOL TO AID IN LOOSENING AND/OR TIGHTENING THREADED FASTNERS, PARTICULARLY IN VEHICLE WHEELS

[76] Inventor: Yehuda Haviv, 36 Nahalat Yitzhak Street, Tel Aviv, Israel

[*] Notice: The portion of the term of this patent subsequent to Jan. 14, 2008 has been disclaimed.

[21] Appl. No.: 393,741

[22] Filed: Aug. 15, 1989

Related U.S. Application Data

[63] Continuation-in-part of Ser. No. 239,729, Sep. 2, 1988.

[51] Int. Cl.⁵ .............................................. B25B 17/00
[52] U.S. Cl. ........................................ 81/57; 81/57.29; 81/57.25; 81/57.24; 81/57.13; 81/57.46
[58] Field of Search ................ 81/57.29, 57.25, 57.24, 81/57.13, 57.46, 57.22, 57 O, 57.39, 57.46, 180.1

[56] References Cited

U.S. PATENT DOCUMENTS 2,836,090  5/1958  Ray ...................................... 81/57.46
3,730,027  5/1973  Rohn ................................... 81/180 R Primary Examiner—Frederick R. Schmidt
Assistant Examiner—Lawrence Cruz
Attorney, Agent, or Firm—Benjamin J. Barish

[57] ABSTRACT

A tool to aid in loosening and/or tightening a threaded fastener with respect to an article receiving the fastener, particularly a vehicle wheel, comprises a base member carrying a rotatably mounted applicator bar having a connector at one end to be coupled to the fastener to be loosened or tightened. A manually-operated force-multiplying device is supported by the base member and is effective to rotate the applicator bar about its longitudinal axis in one direction to loosen, and/or in the opposite direction to tighten, the fastener with respect to the article.

5 Claims, 4 Drawing Sheets

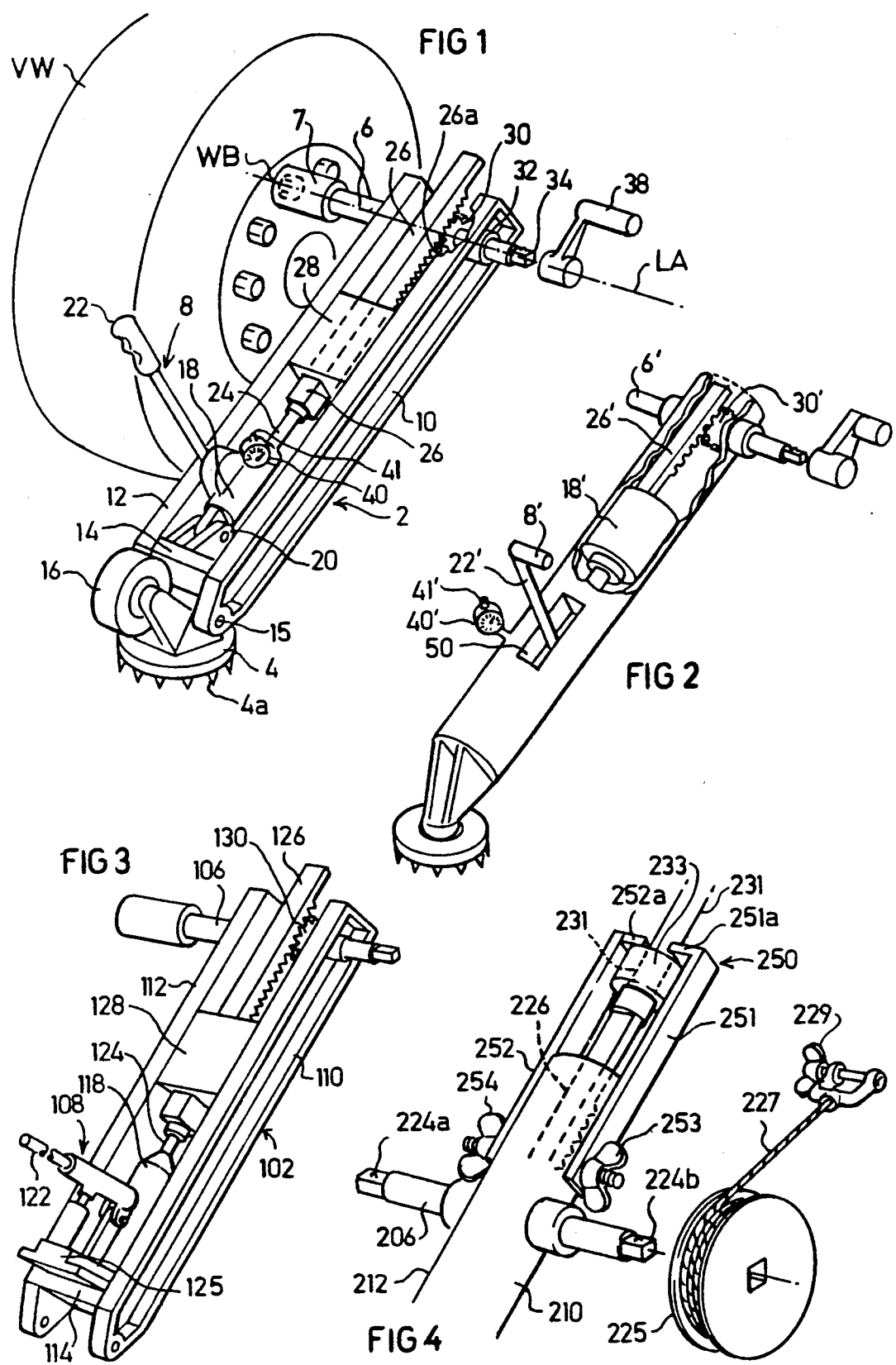

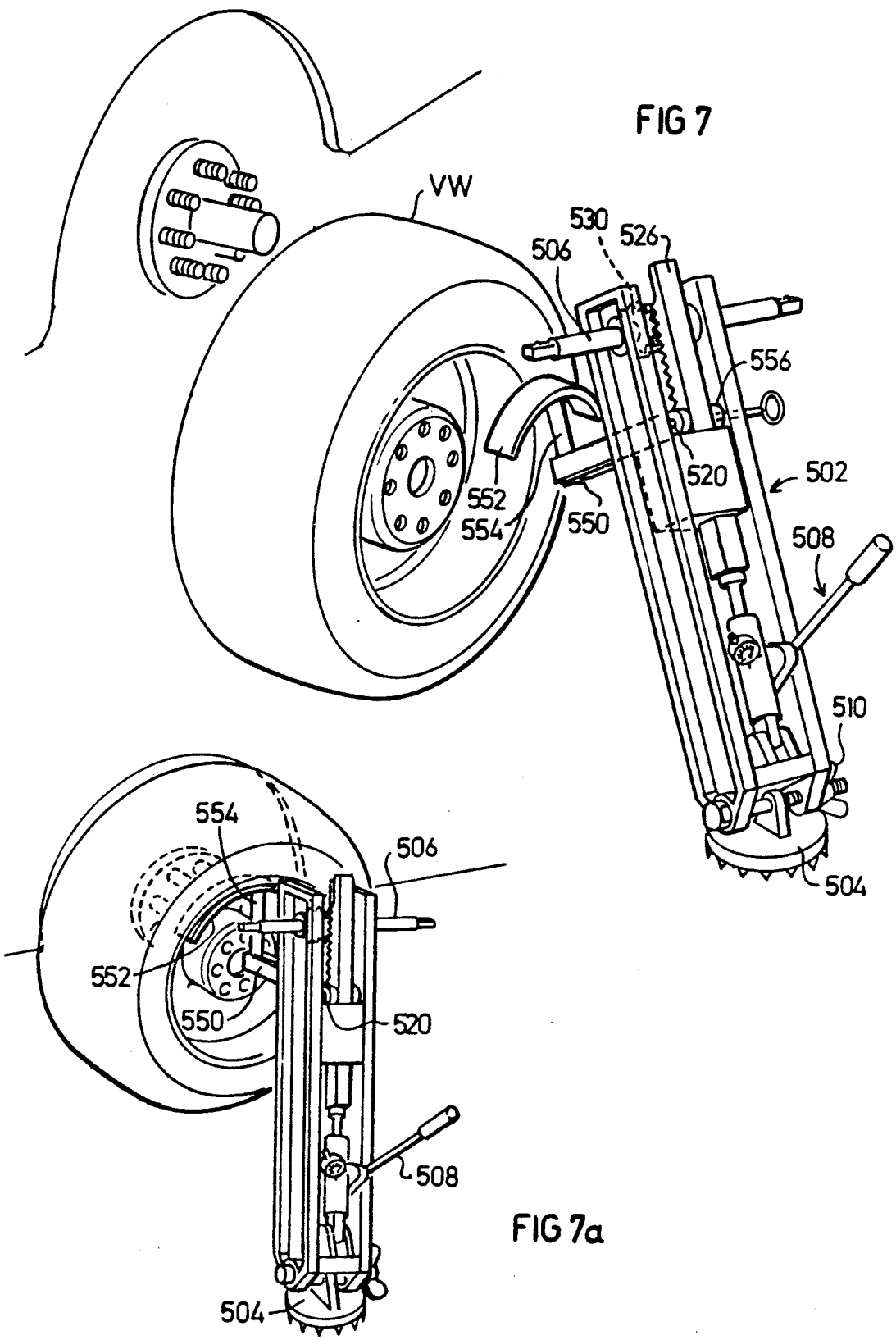

TOOL TO AID IN LOOSENING AND/OR TIGHTENING THREADED FASTNERS, PARTICULARLY IN VEHICLE WHEELS

RELATED APPLICATION

The present application is for a continuation-in-part of my prior U.S. application Ser. No. 07/239,729 filed Sept. 2, 1988.

BACKGROUND OF THE INVENTION

The present invention relates to tools to aid in loosening and/or tightening threaded fasteners with respect to articles. The invention is particularly useful for loosening and/or tightening fasteners in vehicle wheels, and is therefore described below with respect to this application.

Fasteners, such as nuts and bolts, frequently become "frozen" in place, e.g., by rust or settling, such that they are difficult to remove by conventional wrenches or other tools. This problem is particularly present when changing a vehicle wheel where the wheel bolts have not been removed for a long period of time. In such cases, it is necessary to apply an extremely large force to the wheel bolt, which is not always possible with the tools available, in order to loosen the bolt and to permit its removal for changing the wheel.

An object of the present invention is to provide a tool to aid in loosening and/or tightening a threaded fastener with respect to an article, particularly with respect to vehicle wheels.

BRIEF SUMMARY OF THE INVENTION

According to the present invention, there is provided a tool to aid in loosening and/or tightening a threaded fastener with respect to an article receiving the fastener, particularly a vehicle wheel, comprising: a base member having anchoring means for anchoring the base member with respect to the article; an applicator bar having a connector at one end to be coupled to the fastener to be loosened or tightened; mounting means for mounting the applicator bar to one end of the base member permitting rotary movement of the applicator bar about its longitudinal axis; and a manually-operated force-multiplying device supported by the base member and effective to rotate the applicator bar about its longitudinal axis in one direction to loosen, and/or in the opposite direction to tighten, the fastener with respect to the article. The anchoring means comprises a ground-engageable plate pivotally mounted to the opposite end of the base member for anchoring the base member to the ground when the force-multiplying device is manually-operated to loosen or tighten the fastener.

A number of embodiments of the invention are described below for purposes of example. In some described embodiments, the force-multiplying device comprises a hydraulic pump; one described embodiment is especially designed to accommodate a conventional lifting-jack type hydraulic pump commonly available in vehicles, particularly large vehicles such as trucks and busses. Another embodiment of the invention is described wherein the force-multiplying device is a handle having a long lever arm.

In some described embodiments, the applicator bar is coupled to the base member by coupling means comprising a drive bar linearly movable by the force-multiplying device and formed with teeth meshing with teeth of a gear wheel fixed to the applicator bar to rotate the applicator bar upon the linear movement of the drive bar by the force-multiplying device.

Another embodiment is described wherein the base member comprises a pair of base bars pivotally mounted to each other at one of their ends, the opposite end of one base bar rotatably mounting the applicator bar, and the opposite end of the other base bar carrying the anchoring means for anchoring to the article, the force-multiplying device being secured to one of the two base bars. In that embodiment, the anchoring means comprises another connector for connection to another fastener on the article, e.g., the vehicle wheel.

The applicator bar is preferably configured to removably receive the fastener connector at either of the opposite ends of the applicator bar, one end to loosen the fastener and the opposite end to tighten the fastener upon operation of the force-multiplying device.

According to a further described embodiment, the tool may further include a manually-rotatable handle removably attached to the end of the applicator bar opposite to that of the connector, to permit manual rotation and removal of the fastener after it has been loosened by operation of the force-multiplying device. In another described embodiment, the tool may include a winding reel carrying a cable, the winding reel being removably attachable to the end of the applicator bar opposite to that of the connector to permit use of the tool also for applying a force to an object to which the cable is attached. In a further embodiment, the tool may include a clamping member removably attachable to the end of the applicator bar opposite to that of the connector, to permit use of the tool for also applying a force to another object to which the clamping member is attached by the operation of the force-multiplying device.

According to a further described embodiment, the base member may further include a lifting-lowering member removably attachable to the drive bar for lifting or lowering the vehicle wheel.

According to a still further described embodiment, the force-applying means comprises a ratchet wheel fixed to the applicator bar and rotatable with respect to the base member, a driving pawl for driving the ratchet wheel, and a pivotally-mounted handle for manually driving the pawl and the ratchet wheel.

It will thus be seen that a tool constructed with some or all of the foregoing features may be used not only for loosening and/or tightening fasteners on an article, particularly a vehicle wheel, but may also be used to raise or lower the vehicle wheel, or to perform a number of other functions, for example, extractions, by the use of the force-multiplying device included in the tool.

Further features and advantages of the invention will be apparent from the description below.

BRIEF DESCRIPTION OF THE DRAWINGS

The invention is herein described, by way of example only, with reference to the accompanying drawings, wherein:

FIG. 1 illustrates one form of tool constructed in accordance with the present invention, particularly for use in loosening and/or tightening threaded fasteners on vehicle wheels;

FIGS. 2 and 3 are fragmentary views of the tool of FIG. 1 illustrating various modifications;

FIGS. 4 and 5 are fragmentary views illustrating the use of the tool of FIGS. 1-3 for other functions;

FIGS. 7 and 7a illustrates another tool constructed in accordance with the present invention, particularly useful also for raising and lowering the vehicle wheel.

DESCRIPTION OF PREFERRED EMBODIMENTS

Figure 6:
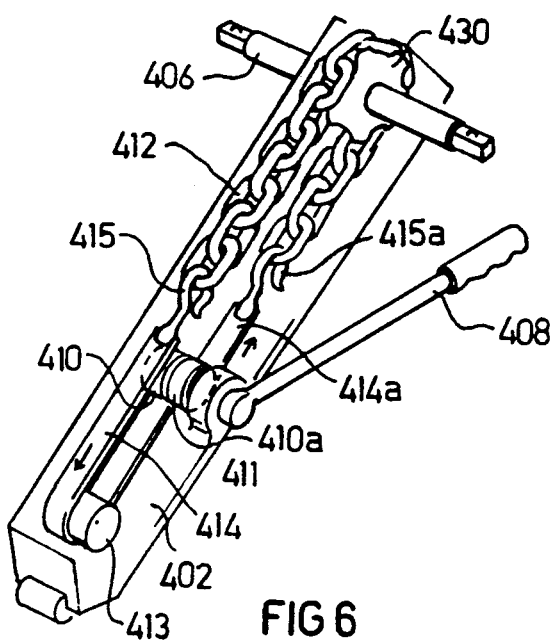
FIG. 6 is a fragmentary view illustrating another form of force-multiplying device which may be used in the tool.

The tool illustrated in FIG. 1 is intended to aid in loosening and/or tightening a wheel bolt WB on a vehicle wheel VW. It comprises a base member, generally designated 2, having anchoring means 4 for anchoring it with respect to the vehicle wheel VW; an applicator bar, generally designated 6, having a connector 7 at one end to be coupled to the wheel bolt WB to be loosened or tightened, the applicator bar being mounted with respect to the base member 2 for rotary movement about the longitudinal axis L of the applicator bar; and a manually-operated force-multiplying device, generally designated 8, supported by the base member 2 and effective to rotate the applicator bar 6 about its longitudinal axis in one direction to loosen the wheel bolt WB, or in the opposite direction to tighten the wheel bolt with respect to the vehicle wheel VW. In the embodiment of the invention illustrated in FIG. 1, the force-multiplying device 8 is a hydraulic pump.

More particularly, base member 2 comprises a pair of legs 10, 12 fixed in parallel spaced relationship by a cross legs 14. One end of the base member 10 is pivotally mounted at 15 to the anchoring member 4, which member is in the form of a circular plate having a plurality of projections 4a depending from its underside for engagement with the ground, a pavement or a floor, for anchoring the base member 2 against longitudinal movement. Anchoring member 4 further includes a roller 16 which facilitates moving the tool, before or after its use, by dragging the tool with its roller 16 in contact with the ground, pavement or floor.

Hydraulic pump 8 includes a pump housing 18 pivotally mounted at 20 between the legs 10, 12 of base member 2, a handle 22 for manually operating the pump, and a plunger bar 24 which is moved outwardly (or inwardly) of housing 18 according to the force produced by operating handle 22. Plunger bar 24 is coupled to a drive bar 26 carrying a guide block 28 guided for movement between the two legs 10, 12 of base member 2. The lower face of guide bar 26 is formed with teeth 26a, which teeth mesh with the teeth of a gear wheel 30 fixed to the applicator bar 6. The applicator bar is rotatably mounted in bearings 32 at the ends of the two legs 10, 12 of base member 2.

The opposite ends of applicator bar 6 are of square (or other non-circular) configuration in order to receive the connector member 7 at either end. FIG. 1 illustrates one of the squared ends 34 of the applicator bar, it being appreciated that the other end is of a similar square configuration (e.g., see FIG. 7), so that the connector 7 may be attached to either end. Thus, in the arrangement illustrated in FIG. 1, the extension of drive bar 26 by hydraulic pump 8 will rotate applicator bar 6 clockwise, to rotate the wheel bolt WB in the same clockwise direction in order to loosen (or tighten) it with respect to the vehicle wheel VW; if it is desired to rotate the wheel bolt in the opposite direction, e.g., to tighten (or loosen) a wheel bolt to be rotated counter-clockwise for this purpose, the connector 7 may be attached to the opposite (right, FIG. 1) squared end of the applicator bar 6, in which case the base member 2 would be reversed in position.

The squared ends 34 of the applicator bar 6 are also adapted to receive a removably attachable handle 38, so that once a wheel bolt is loosened by the operation of hydraulic pump 8, drive bar 26 may be manually pivoted upwardly out of contact with gear wheel 30, and then the handle 38 may be attached to the squared end 34 of the applicator bar, opposite to that carrying the connector member 7, so as to manually rotate the applicator bar and thereby manually remove the wheel bolt. Handle 38 may also be used in initially applying the wheel bolt before it is tightened by operation of the hydraulic pump 8.

The illustrated tool further includes a pressure gauge 40 carried by pump housing 18 to indicate the pressure developed by the pump when operating its handle 22. The pump also includes a safety valve (41) that may be adjusted for maximum pressure loads when used for fastening, to prevent over-fastening and breakage of wheel bolts.

The manner of using the tool illustrated in FIG. 1 will be apparent from the above description. Thus, assuming a wheel bolt WB is to be loosened by rotating the wheel bolt clockwise, the illustrated tool is oriented as illustrated in FIG. 1 with respect to the vehicle wheel VW, with connector member 7 carried by the squared end of the applicator bar 6 coupled to the wheel bolt. Handle 22 of hydraulic pump 8 is then operated to forcefully extend plunger 24 from the pump housing 18. Drive bar 26 coupled to plunger 24 is thus moved linearly in the same direction, such that its teeth 26a meshing with gear 30 rotate the gear, together with applicator bar 6 fixed thereto, in the clockwise direction to loosen the wheel bolt. When the wheel bolt has been sufficiently loosened, drive bar 26 is manually lifted to disengage its teeth 26a from gear teeth 30, and handle 38 is applied to the free end of applicator bar 6, to permit the user to rotate the applicator bar in the same clockwise direction in order to remove the wheel bolt from the vehicle wheel.

If the wheel bolt WB is loosened by rotating it in the opposite direction, or if it is desired to tighten the wheel bolt rather than to loosen it, base member 2 is reversed in position so that the squared end 34 of the applicator bar, shown at the right side in FIG. 1, now faces the wheel bolt WB. The connector member 7 is applied to that squared end of the applicator bar so that operating the hydraulic pump 8 will rotate the applicator bar 6, and thereby the wheel bolt TB, in the opposite direction.

FIG. 2 illustrates a modification in the tool, wherein the base member, therein designated 2', is in the form of a cylindrical housing, which encloses the housing 18' of the hydraulic pump 8' as well as the drive bar 26' driven thereby. Housing 2' is formed with a slot 50 for accommodating the handle 22' of the hydraulic pump 8' which includes pressure gauge 40' and safety valve 41', and for permitting its reciprocation in order to operate the pump to project drive bar 26'. The drive bar is coupled to the applicator bar 6' via gear 30', as described above with respect to FIG. 1. In all other respects, the tool illustrated in FIG. 2 is constructed and operates in the same manner as described above with respect to FIG. 1.

FIG. 3 illustrates a further variation in the construction of the base member, therein designated 102, which permits the use of a standard hydraulic-pump type lifting jack commonly available in vehicles, particularly trucks and busses, for use in changing wheels. Thus, the conventional lifting jack, generally designated 108 in FIG. 3, comprises a housing 118 for the hydraulic pump, a handle 122, a plunger 124 projectible from the housing 118 upon reciprocation of the handle 122, and a base 125 normally used for supporting the jack on the ground or other horizontal surface. In this case, base member 102 is provided with two parallel legs 110, 112 connected by a cross leg 114, arranged so as to support the pump housing 118 and plunger 124 between the two parallel legs 110, 112 with the pump base 125 engaging the cross leg 114. The tool illustrated in FIG. 3 further includes a drive bar 126, corresponding to drive bar 26 in FIG. 1, carrying a guide block 128 which is engageable with plunger 124 of the pump, upon operation of the pump, in order to drive the bar 126 linearly upon operation of the pump, and thereby to rotate the applicator bar 106 via the gear 130 upon operation of the pump handle 122, in the same manner as described above with respect to FIG. 1.

FIG. 4 illustrates a variation which may be included in any of the above-described embodiments. According to the variation of FIG. 4, the applicator bar, therein designated 206, which is provided with square-shaped ends 224a, 224b as described above with respect to FIG. 1, is adapted to be coupled to a reel 225 carrying a cable 227 having a clamp 229 at one end. Thus, the force generated by operation of the pump (e.g., 8, FIG. 1) and applied via the drive bar 226 to the applicator bar 206, may be used not only for loosening or tightening wheel bolts, but may also be used via reel 225 and cable 227 applied to one end of applicator bar 206, to apply a force to another object connected to the end of cable 227 by clamp 229, e.g., to pull a heavy load, or to force-open a door.

FIG. 4 also illustrates a further accessory which may be applied to the tool to enable its use for extracting or separating one member, e.g., a pin 231, from another member, e.g., a nut 233. This latter accessory includes an attachment, generally designated 250, comprising a pair of arms 251, 252 attachable by fasteners 253, 254 to the two legs or sides 210, 212 of the base member. Arms 251, 252 are formed with inwardly-directed extensions 251a, 252a engageable with the outer face of the nut 233; whereas the inner face of the pin 231 is engaged by the end face of drive bar 226. The arrangement is such that the actuation of the drive bar 226 (by the hydraulic pump, e.g., 8, FIG. 1), forces the pin 231 through the nut 233.

Figure 5:
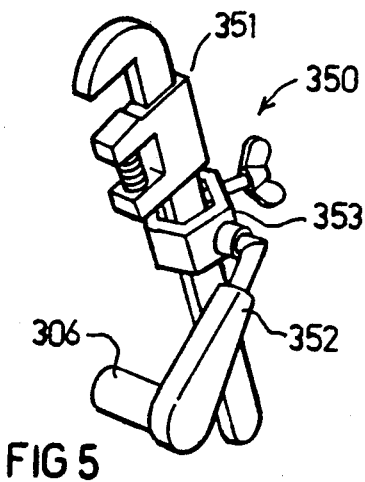

FIG. 5 illustrates a further accessory, generally designated 350, which may be attached to the square-end of the applicator bar (e.g., 206, FIG. 4) in order to enable the force generated by the hydraulic pump also to be used for rotating a wrench 351, secured to the applicator bar 306 by means of a lever arm 352 and a clamp 353. Thus, whenever it is desired to apply a force to another object, e.g., to separate a part from another part, or to force a part away from another part, wrench 351 is clamped to the part to receive the force and in turn is clamped to arm 352 via clamp 353; and arm 352 is applied to the square-end of the applicator bar 306, such that the rotation of the applicator bar by operation of the hydraulic pump will apply a large force to the part to which the wrench 351 is clamped.

FIG. 6 illustrates a modification in the tool, wherein the manually-operated force-multiplying device is a long lever arm 408, rather than a hydraulic pump as in the earlier-described embodiments. In the FIG. 6 embodiment, lever arm 408 is coupled to drums 410 and 410a rotatably mounted to the base member 402. To drums 410 and 410a are attached one of the ends of belts 414 and 414a, respectively. The other ends of belts 414 and 414a are connected to hooks 415 and 415a, respectively, to which are coupled the two ends of chain 412. Chain 412 is also coupled to a gear 430 fixed to the applicator bar 406. Belt 414 is rotatable around another drum 413 such that when lever 408 is pulled towards the user, belt 414 rotates about drum 413 in the direction of the arrow and winds around drum 410, thereby increasing the strain on chain 412. At the same time, as the force applied increases, belt 414a is unwound from drum 410a, in the direction of the arrow, to relieve tension and permit rotation of applicator bar 406 via engagement of chain 412 with gear 430.

Thus, pivoting handle 408 in one direction rotates the applicator bar 406 in one direction to loosen (or tighten) the fastener to which the applicator bar is connected; and pivoting handle 408 in the opposite direction rotates the applicator bar 406 in the opposite direction.

FIG. 7 illustrates a tool similar to that of FIG. 1, including a base member 502, an anchoring member 504, an applicator bar 506, and a force-multiplying device 508, except that the tool illustrated in FIG. 7 further includes a lifting-lowering member, generally designated 550, enabling the force generated by the force-multiplying device 508 also to be used for lifting and/or lowering the vehicle wheel VW when changing wheels.

The lifting-lowering member 550 comprises a curved plate 552 receivable under the rim of the vehicle wheel carried at one end of an angle-bar 554. The opposite end of the angle-bar is secured by a removable clamping device 556 to the inner end of drive bar 526. The arrangement is such that when it is desired to lift the vehicle wheel VW, the lifting-lowering attachment 550 is clamped to drive bar 526 by clamp 556 so that operating the force-multiplying device 508 to project drive bar 526 outwardly of its base member 502 raises the curved plate 552 and the wheel rim supported thereby as shown in FIG. 7a, whereas operating device 508 in the reverse direction to retract drive bar 526 lowers the vehicle wheel. During the raising or lowering of the vehicle wheel, drive bar 526 may be decoupled from gear 530 of the applicator bar 506 by merely pivoting the drive bar about is pivot point 520 to disengage from gear 530. In all other respects, the tool illustrated in FIG. 7 is constructed and is operated in the same manner as described above with respect to FIG. 1.

Figure 8:
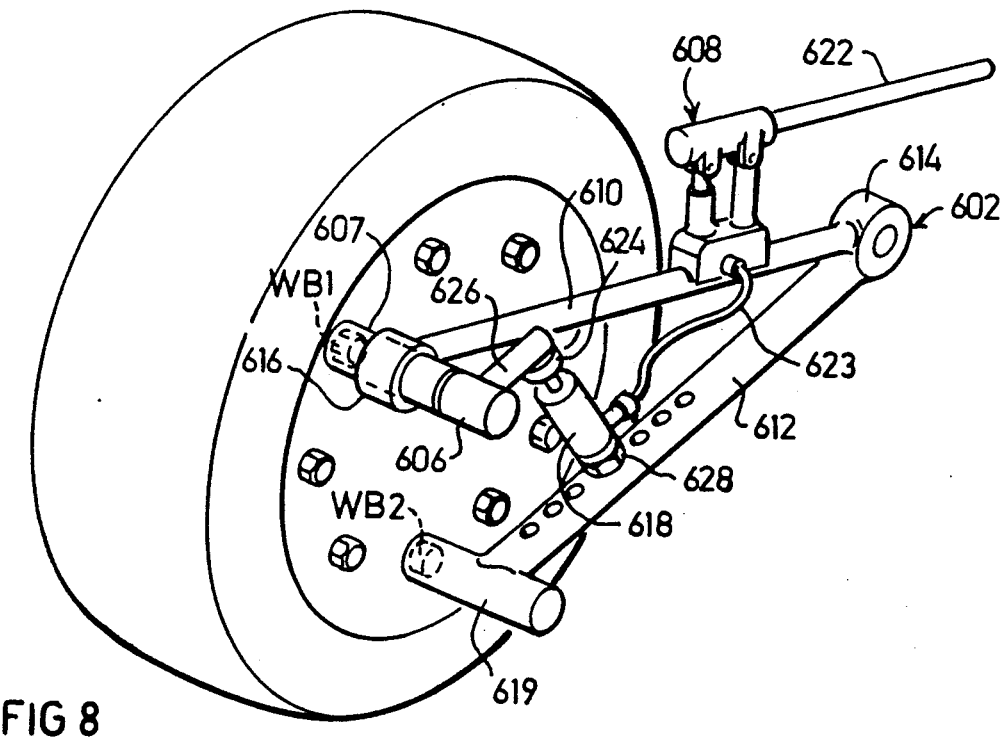
FIGS. 8 and 9 illustrate two further embodiments of the invention particularly useful for loosening and/or tightening threaded fasteners on vehicle wheels.

FIG. 8 illustrates another tool constructed in accordance with the invention wherein the base member, therein designated 602, is not anchored with respect to the ground, but rather is anchored with respect to another wheel bolt WB of the vehicle wheel VW.

Thus, as shown in FIG. 8, the base member 602 comprises a pair of bars 610, 612, pivotally mounted together at 614. The free end of bar 610 carries a sleeve 616 which rotatably mounts the applicator bar 606 and its connector 607 attached to the wheel bolt $WB_1$ to be loosened or tightened, whereas the free end of the other bar 612 carries another connector 618 to be attached to another wheel bolt $WB_2$ on the vehicle wheel, the pivotal mounting 614 permitting the two bars 610, 612 to be adjusted for this purpose. The force-multiplying device 608 in this case is also a hydraulic pump, including a housing 618 for the hydraulic pump and mounted on bar 612, and a handle 622 mounted on bar 610 and connected to housing 618 via a hydraulic tube 624. Plunger 624 projecting from housing 618 is aligned with a stem 626 carried by applicator bar 606 perpendicularly to the longitudinal axis of the applicator bar, such that when plunger 624 is projected by the operation of pump hand 622, it applies a force via stem 626 to rotate the applicator bar 606, and thereby to cause its connector 607 to loosen (or tighten) the wheel bolt $WB_1$.

As illustrated in FIG. 8, bar 612 of base member 602 is provided with a plurality of openings along its length to permit the housing 618 of the hydraulic pump to be attached, by fasteners 628, at the proper location so as to underlie stem 626 of the applicator bar 606.

Figure 9:
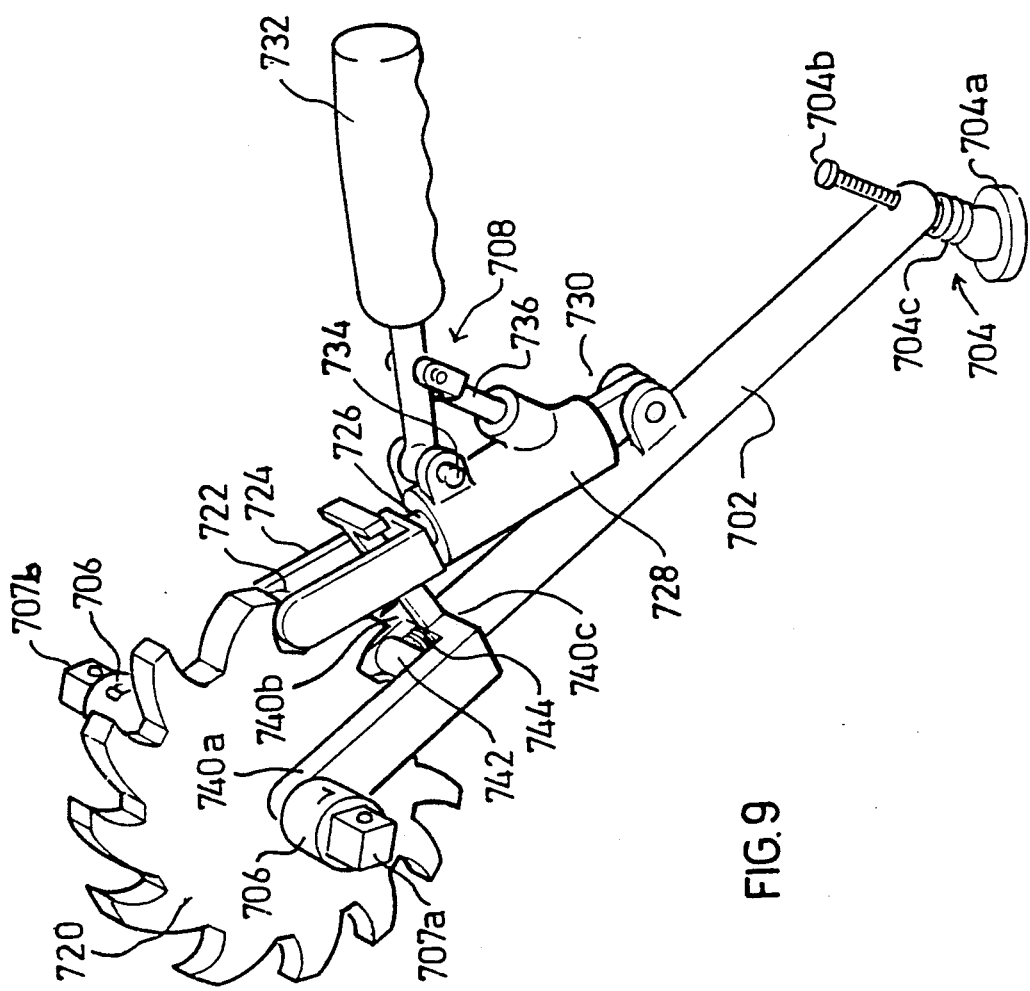

FIG. 9 illustrates a still further embodiment of the invention, comprising a base member 702 having anchoring means 704 for anchoring the tool with respect to the vehicle wheel, an applicator 706 having connectors 707a, 707b at its opposite ends to be coupled to the wheel bolt or nut to be loosened or tightened, and a manually-operated force-multiplying device, generally designated 708, supported by the base member 702 and effective to rotate the applicator bar 706 about its longitudinal axis to tighten or loosen the wheel bolts or nuts.

In the embodiment illustrated in FIG. 9, the anchoring means 704 comprises a torque meter including circular plate 704a engageable with the ground, a pin 704b pivotally coupling plate 704a to base member 702, and a spring 704c between the pin and base member. The pin includes graduation markings indicating the force applied by the force multiplying device 708 to the wheel bolt.

Also, the force-applying means comprises a ratchet wheel 720 fixed to the applicator bar 706 and rotatable with it with respect to the base member 702, and a driving pawl 722 for driving the ratchet wheel 720. Driving pawl 722 is carried between the arms of a bail 724 fixed to one end of a piston 726 movable in a cylinder 728 pivotally mounted at 730 with respect to base member 702.

Cylinder 728 and piston 726 comprise a hydraulic pump which is operated by handle 732 pivotally mounted at 734 to the pump cylinder 728. Handle 732 is coupled to a plunger 736 which pumps the hydraulic fluid within cylinder 728 upon the manual oscillation of handle 732, to force piston 726 outwardly, and thereby to cause pawl 722 to rotate ratchet wheel 720 and its applicator bar 706 in the direction of the arrow.

As in the previously-described embodiments, the applicator bar 706 carries, at its opposite ends, a pair of connectors 707a, 707b engageable with the wheel bolts or nuts to be tightened or loosened. Thus, connector 707a is used to rotate the wheel bolt or nut in the direction to tighten it, whereas connector 707b is rotated in the opposite direction so as to loosen the bolt or nut.

Ratchet wheel 720 and applicator bar 706 are rotatably mounted with respect to base member 702 by a bail which includes a pair of spaced legs 740a, 740b rotatably mounting sprocket wheel 720, and a connecting leg 740c fixed to base member 702. Bail leg 740c carries a locking element 742 spring-urged into the space between the teeth of the sprocket wheel 720 for locking the sprocket wheel against rotation.

The tool illustrated in FIG. 9 is used in the same manner as described above, for example with respect to FIG. 1. Thus, a connector 707a, 707b at one end of the tool is inserted into the wheel bolt or nut to be tightened or loosened, whereas anchor member 704 is used to anchor the tool with respect to the ground. Handle 732 is reciprocated to produce a large force within the hydraulic pump cylinder 728, which drives pawl 722 outwardly to rotate the sprocket wheel 720, its applicator bar 706, and the connector 707a, 707b engaging the bolt or nut to be tightened or loosened. When pawl 722 has been driven outwardly (leftwardly, FIG. 9) for its full distance, cylinder 728 may be pivoted at pivot 730 so as to remove the pawl 722 from the sprocket wheel 720, piston 726 is then retracted, and the pawl is pivoted back downwardly to be received between another pair of teeth in the sprocket wheel. The force applied to loosen the bolt is indicated by the graduation markings on pin 704c of the torque meter.

It will thus be seen that the arrangement illustrated in FIG. 9 can be used for applying a very substantial forces to tighten or loosen wheel or tire bolts.

In the FIG. 9 arrangement, it is contemplated that the hydraulic pump (piston 726, cylinder 728) may be omitted, and the force produced by pivoting handle 732 applied directly to the pawl 722. It is also contemplated that base member 702 may be telescopic, to enable its length to be adjusted according to any particular application.

While the invention has been described with respect to several preferred embodiments, it will be appreciated that these are shown purely for purposes of example, and that many other variations, modifications and applications of the invention may be made.

What is claimed is:

1. A tool to aid in loosening and/or tightening a threaded fastener with respect to an article receiving the fastener, particularly a vehicle wheel, comprising:

a base member having anchoring means for anchoring the base member with respect to said article;

an applicator bar having a connector at one end to be coupled to the fastener to be loosened or tightened;

mounting means for mounting said applicator bar to one end of said base member permitting rotary movement of the applicator bar about its longitudinal axis;

and a manually-operated force-multiplying device supported by said base member and effective to rotate said applicator bar about its longitudinal axis in one direction to loosen, and/or in the opposite direction to tighten, said fastener with respect to said article;

said force-applying means comprising a ratchet wheel fixed to said applicator bar and rotatable with respect to said base member, a driving pawl for driving said ratchet wheel, and a pivotally-mounted handle for manually driving said pawl and said ratchet wheel;

said anchoring means comprising a ground-engageable plate pivotally mounted to the opposite end of said base member for anchoring the base member to the ground when the force-multiplying device is manually operated to loosen or tighten a fastener.

2. The tool according to claim 1, wherein said ground-engageable plate is pivotally mounted on one side to said base member and is formed with a plurality of ground-engageable projections on the opposite side.

3. The tool according to claim 1, wherein said applicator bar is rotatably mounted by said mounting means to said base member, and is coupled to said force-multiplying device by coupling means effective upon operation of the force-multiplying device to rotate the applicator bar about its longitudinal axis.

4. The tool according to claim 1, wherein said ratchet wheel and applicator bar are rotatably mounted with respect to said base member by a bail member.

5. The tool according to claim 4, wherein said bail member further includes a spring-urged locking element for locking the ratchet wheel in any position to which it has been moved by the driving pawl.

* * * * *